United States Patent
Williams et al.

(10) Patent No.: US 7,908,487 B2
(45) Date of Patent: Mar. 15, 2011

(54) SYSTEMS AND METHODS FOR PUBLIC-KEY ENCRYPTION FOR TRANSMISSION OF MEDICAL INFORMATION

(75) Inventors: Jessica Landisman Williams, Decatur, GA (US); Troy Donovan Casey, Stockbridge, GA (US)

(73) Assignee: NDCHealth Corporation, Atlanta, GA (US)

( * ) Notice: Subject to any disclaimer, the term of this patent is extended or adjusted under 35 U.S.C. 154(b) by 961 days.

(21) Appl. No.: 11/746,867

(22) Filed: May 10, 2007

(65) Prior Publication Data

US 2008/0040602 A1 Feb. 14, 2008

Related U.S. Application Data

(60) Provisional application No. 60/799,531, filed on May 10, 2006.

(51) Int. Cl.
*H04L 9/32* (2006.01)
*G06F 11/30* (2006.01)
*G06F 12/14* (2006.01)

(52) U.S. Cl. ........ 713/189; 713/187; 713/188; 713/190; 713/191; 713/192; 726/27; 726/28; 726/29; 726/30

(58) Field of Classification Search .................. 713/189
See application file for complete search history.

(56) References Cited

U.S. PATENT DOCUMENTS

| | | | |
|---|---|---|---|
| 5,301,105 A | 4/1994 | Cummings | |
| 5,644,778 A | 7/1997 | Burks et al. | |
| 5,832,447 A | 11/1998 | Rieker et al. | |
| 5,845,255 A | 12/1998 | Mayaud | |
| 5,892,900 A | 4/1999 | Ginter et al. | |
| 5,950,169 A | 9/1999 | Borghesi et al. | |
| 5,956,736 A | 9/1999 | Hanson et al. | |
| 5,963,915 A | 10/1999 | Kirsch | |
| 5,991,750 A | 11/1999 | Watson | |
| 6,224,387 B1 | 5/2001 | Jones | |
| 6,282,522 B1 | 8/2001 | Davis et al. | |
| 6,307,940 B1 | 10/2001 | Yamamoto et al. | |
| 6,343,271 B1 | 1/2002 | Peterson et al. | |
| 6,427,020 B1 | 7/2002 | Rhoads | |
| 6,879,959 B1 | 4/2005 | Chapman et al. | |

(Continued)

FOREIGN PATENT DOCUMENTS

GB 2329271 A 7/1999

OTHER PUBLICATIONS

Claim Gear Index, Printed Apr. 9, 2002, http://www.claimgear.com/Overview.htm (15 pages).

(Continued)

*Primary Examiner* — Longbit Chai
(74) *Attorney, Agent, or Firm* — Sutherland Asbill & Brennan LLP

(57) ABSTRACT

The invention is directed to systems and methods for communicating sensitive and/or confidential medical information with the use of encryption. Specifically, the invention is directed to transmitting a request for sensitive medical data, where the request includes a public key for encryption as an XML node. The public key may be used by the responding party to encrypt at least a portion of the response and respond to the request. The only party in the network path that is able to decrypt the message is the originator of the request because the requestor will have a private keys which is required to decrypt the response data.

19 Claims, 3 Drawing Sheets

U.S. PATENT DOCUMENTS

| | | | |
|---|---|---|---|
| 7,013,284 | B2 | 3/2006 | Guyan et al. |
| 7,111,173 | B1 | 9/2006 | Scheidt |
| 7,356,460 | B1 | 4/2008 | Kennedy et al. |
| 7,418,400 | B1 | 8/2008 | Lorenz |
| 7,617,116 | B2 | 11/2009 | Amar et al. |
| 2001/0001014 | A1 | 5/2001 | Akins et al. |
| 2001/0032099 | A1 | 10/2001 | Joao |
| 2001/0037224 | A1 | 11/2001 | Eldridge et al. |
| 2002/0035488 | A1 | 3/2002 | Aquila et al. |
| 2002/0120473 | A1 | 8/2002 | Wiggins |
| 2002/0128883 | A1 | 9/2002 | Harris |
| 2002/0138593 | A1 | 9/2002 | Novak et al. |
| 2002/0178370 | A1 | 11/2002 | Gurevich et al. |
| 2003/0009357 | A1 | 1/2003 | Pish |
| 2003/0028404 | A1 | 2/2003 | Herron et al. |
| 2003/0149594 | A1 | 8/2003 | Beazley et al. |
| 2004/0139319 | A1* | 7/2004 | Favazza et al. ............... 713/168 |
| 2005/0033604 | A1 | 2/2005 | Hogan |
| 2005/0288972 | A1* | 12/2005 | Marvin et al. .................... 705/4 |

OTHER PUBLICATIONS

Coffey et al., "The Case for National Health Data Standards," Sep./Oct. 1997, Health Affairs, v16n5, pp. 58-72.
International Search Report for PCT/US02/13342 dated Sep. 4, 2002 (6 pages).
White, Ron., "How Computers Work", Copyright 1999 by Que Corporation.
ICSA Guide to Cryptography, Randall K. Nichols, 1999, McGraw-Hill, pp. 460-461.
Final Office Action for U.S. Appl. No. 10/133,001 mailed Feb. 6, 2006.
Final Office Action for U.S. Appl. No. 10/133,001 mailed Jul. 22, 2005.
Final Office Action for U.S. Appl. No. 12/115,298 mailed Dec. 24, 2009.
Non-Final Office Action for U.S. Appl. No. 12/115,298 mailed May 29, 2009.
Letter addressed to Scott Mackenzie of Per-Se Technologies from Mack Ed Swindle, Esq. of Whitaker, Chalk, Swindle & Sawyer, LLP dated Jul. 21, 2006, regarding U.S. Appl. No. 10/133,001 and U.S. Appl. No. 10/439,422.
Letter addressed to Mac Ed Swindle of Whitaker, Chalk, Swindle & Sawyer, LLP from Griff Griffin, Esq. of Sutherland Asbill & Brennan LLP dated Sep. 14, 2006, regarding U.S. Appl. No. 10/133,001 (2 pages).
Letter addressed to Griff Griffin, Esq. of Sutherland Asbill and Brennan LLP from Mack Ed Swindle of Whitaker, Chalk, Swindle & Sawyer, LLP dated Oct. 2, 2006 (2 pages); and attached press release dated 2001 and 2002 (2 pages), regarding U.S. Appl. No. 10/133,001 and U.S. Appl. No. 10/439,422.
Letter addressed to Christopher J. Chan, Esq. of Sutherland Asbill & Brennan LLP from Mac Ed Swindle of Whitaker, Chalk, Swindle & Sawyer, LLP dated May 8, 2007 (1 page); and attached Affidavit of Ben Loy (10 pages) regarding U.S. Appl. No. 10/133,001.
Exhibit A ("Public-Key Cryptography, NIST Special Publication 800-2," Apr. 1991) to Letter addressed to Christopher J. Chan of Sutherland Asbill & Brennan LLP from Mack Ed Swindle of Whitaker, Chalk, Swindle & Sawyer, LLP dated May 8, 2007, regarding U.S. Appl. No. 10/133,001 (132 pages).
Exhibit B ("Escrowed Encryption Standard (EES)," Feb. 9, 1994) to Letter to Christopher J. Chan of Sutherland Asbill & Brennan LLP from Mack Ed Swindle of Whitaker, Chalk, Swindle & Sawyer, LLP dated May 8, 2007, regarding U.S. Appl. No. 10/133,001 (8 pages).
Exhibit C ("Entity Authentication Using Public Key Cryptography," Feb. 18, 1997) to Letter to Christopher J. Chan of Sutherland Asbill & Brennan LLP from Mack Ed Swindle of Whitaker, Chalk, Swindle & Sawyer, LLP dated May 8, 2007, regarding U.S. Appl. No. 10/133,001 (50 pages).
Exhibit D ("Internet x. 509 Public Key Infrastructure Certificate Management Protocols," Mar. 1999) to Letter to Christopher J. Chan of Sutherland Asbill & Brennan LLP from Mack Ed Swindle of Whitaker, Chalk, Swindle & Sawyer, LLP dated May 8, 2007, regarding U.S. Appl. No. 10/133,001 (65 pages).
Exhibit E ("PDX 4.0 Pharmacy Manual, Canada Claims section from Jan. 2000," Feb. 18, 1997) to Letter to Christopher J. Chan of Sutherland Asbill & Brennan LLP from Mack Ed Swindle of Whitaker, Chalk, Swindle & Sawyer, LLP dated May 8, 2007, regarding U.S. Appl. No. 10/133,001 (4 pages).
Letter addressed to Mac Ed Swindle of Whitaker, Chalk, Swindle & Sawyer, LLP from Christopher J. Chan, Esq. of Sutherland Asbill & Brennan LLP dated May 30, 2007, regarding U.S. Appl. No. 10/133,001 (2 pages).
Letter addressed to Kevin King, Esq. of Sutherland Asbill and Brennan LLP and Mr. Paul J. Quinar of Per Se Technologies from Mack Ed Swindle of Whitaker, Chalk, Swindle & Sawyer, LLP dated Feb. 12, 2007, regarding U.S. Appl. No. 11/364,987 (2 pages).
Letter addressed to Mac Ed Swindle of Whitaker, Chalk, Swindle & Sawyer, LLP from Christopher J. Chan, Esq. of Sutherland Asbill & Brennan LLP dated Mar. 14, 2007, regarding U.S. Appl. No. 11/364,987 (2 pages).
Letter addressed to Christopher J. Chan, Esq. of Sutherland Asbill & Brennan LLP from Mac Ed Swindle of Whitaker, Chalk, Swindle & Sawyer, LLP dated May 15, 2007 (1 page) regarding U.S. Appl. No. 11/364,987 (3 pages) and referenced attachments (OPUS-ISM LLC web page—1 page) and (CareMax Connection brochure excerpt—2 pages).
Letter addressed to Mac Ed Swindle of Whitaker, Chalk, Swindle & Sawyer, LLP from Christopher J. Chan, Esq. of Sutherland Asbill & Brennan LLP dated Jun. 7, 2007, regarding U.S. Appl. No. 11/364,987 (2 pages).
Letter addressed to Mac Ed Swindle of Whitaker, Chalk, Swindle & Sawyer, LLP from Griff Griffin, Esq. of Sutherland Asbill & Brennan LLP dated Sep. 14, 2006, regarding U.S. Appl. No. 10/439,422 (2 pages).
Letter addressed to Christopher J. Chan, Esq. of Sutherland Asbill & Brennan LLP from Mac Ed Swindle of Whitaker, Chalk, Swindle & Sawyer, LLP dated May 8, 2007, regarding U.S. Appl. No. 10/439,422 (1 page).
Affidavit of Ken Hill to letter addressed to Christopher J. Chan, Esq. of Sutherland Asbill & Brennan LLP from Mac Ed Swindle of Whitaker, Chalk, Swindle & Sawyer, LLP dated May 8, 2007, regarding U.S. Appl. No. 10/439,422 (5 page) and attached Exhibits A (5 pages) and B (49 pages).
Letter addressed to Mac Ed Swindle of Whitaker, Chalk, Swindle & Sawyer, LLP from Christopher J. Chan, Esq. of Sutherland Asbill & Brennan LLP dated Jun. 7, 2007, regarding U.S. Appl. No. 10/439,422 (2 pages).
Non-Final Office Action for U.S. Appl. No. 12/766,418 mailed Jul. 7, 2010.
Final Office Action for U.S. Appl. No. 12/766,418 dated Dec. 13, 2010.
Non-Final Office Action for U.S. Appl. No. 11/957,171 mailed Dec. 27, 2010.

* cited by examiner

SYSTEMS AND METHODS FOR PUBLIC-KEY ENCRYPTION FOR TRANSMISSION OF MEDICAL INFORMATION

CROSS-REFERENCE TO RELATED APPLICATION

This application claims the benefit of priority to U.S. Provisional Patent Application Ser. No. 60/799,531 entitled, "Systems and Methods for Public-Key encryption for Transmission of Medical Information," which was filed in the United States Patent and Trademark Office on May 10, 2006, the specification of which is hereby incorporated by reference.

FIELD OF THE INVENTION

This invention relates to the transmission of sensitive and/or confidential information in health care related transactions. More specifically, the invention relates to communicating sensitive and/or confidential medical data with the use of encryption.

BACKGROUND OF THE INVENTION

In the electronic prescribing and/or messaging environment, there is sensitive or confidential information that needs to be passed between entities such as medication history, formulary information and other sensitive or confidential information. It is important to keep this information confidential. However, during delivery to the destination in current systems such data may pass through networks of competitors entity where confidentiality of the information sent may be compromised.

SUMMARY OF THE INVENTION

The invention is directed to systems and methods for communicating sensitive and/or confidential medical information with the use of encryption. Example embodiments of the invention are directed to transmitting a request for sensitive medical data, where the request includes a public key for encryption as an XML node. Moreover, example embodiments of the invention utilize public-key encryption technology, which includes a public key for encrypting response data and a private key used for decrypting the response data. In an example embodiment of the invention, the public key transmitted in the request may be used by the responding party to encrypt the response message and respond to the request. The private key is required to decrypt the response data. In an example embodiment of the invention only the originator of the request message is able to decrypt the response message.

The requested information may be formulary information, eligibility information, patient medical records, medication history information, prior authorization information, or other information that would be considered confidential, proprietary, private or sensitive to the requester or responder. The parties acting as a requestor or responder (depending on who initiated the communication) may be patients, pharmacies, retailers, pharmacy benefit management services (PBMs), physicians' offices, hospitals, payer systems, or other parties that handle medical related information. Various embodiments of the invention as well as additional features are discussed in more detail below.

BRIEF DESCRIPTION OF THE FIGURES

Figure 1:
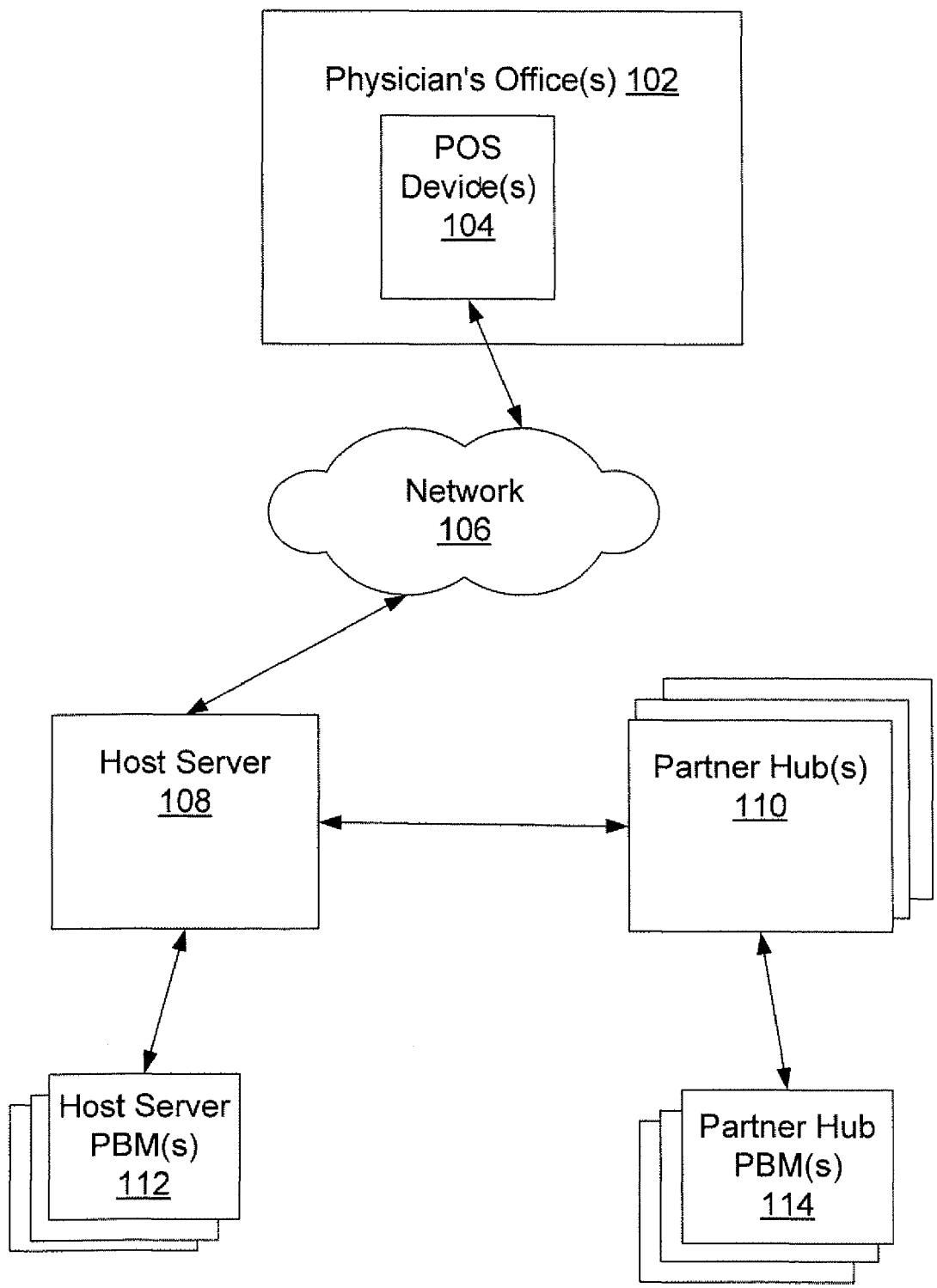

Having thus described the invention in general terms, reference will now be made to the accompanying drawings, which are not necessarily drawn to scale, and wherein:

FIG. 1 shows a transmission system for communicating confidential medical information in accordance with an example embodiment of the invention.

Figure 2:
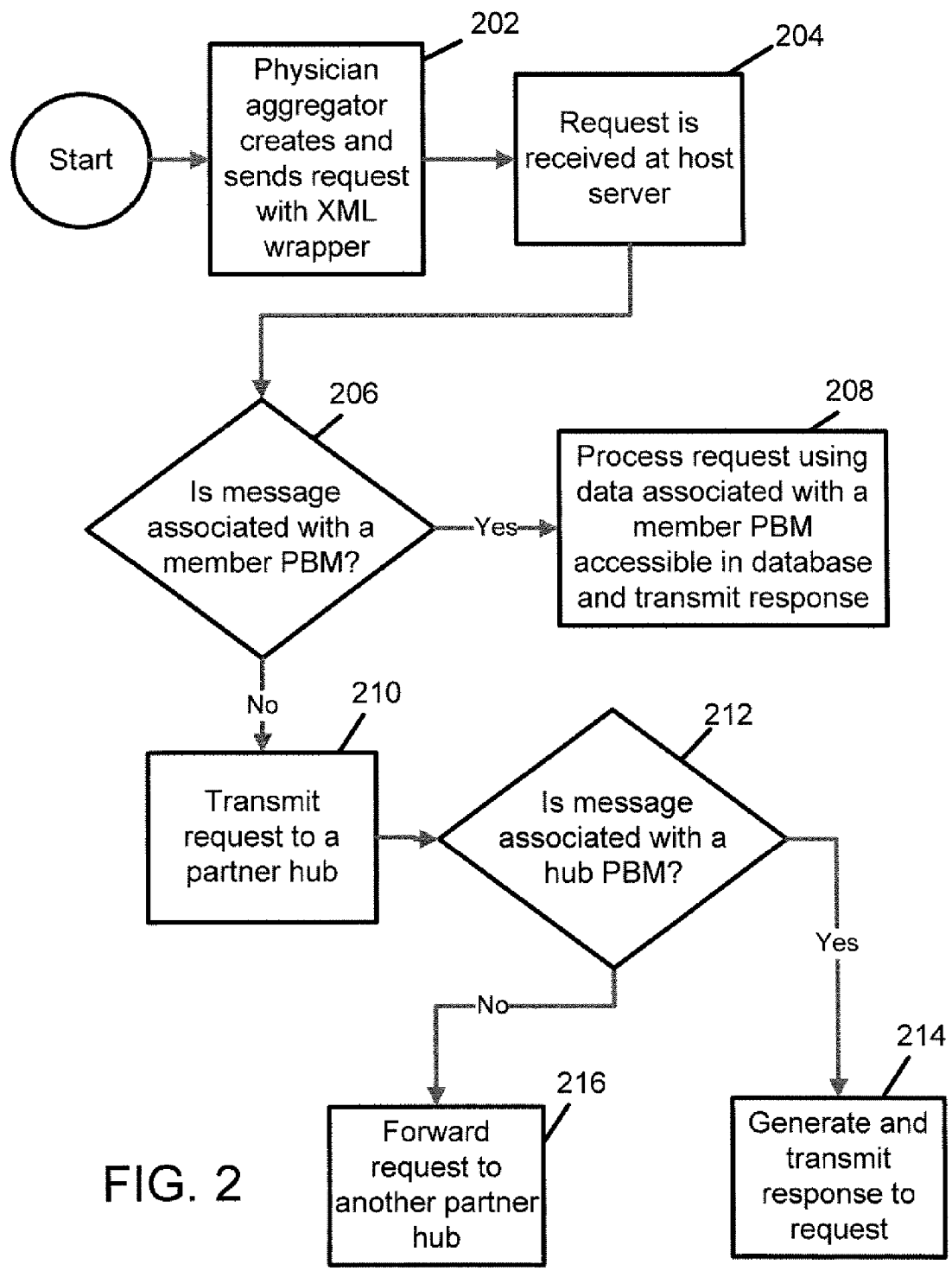

FIG. 2 shows a block diagram flowchart of the process for communicating confidential medical information in accordance with an example embodiment of the invention.

Figure 3:
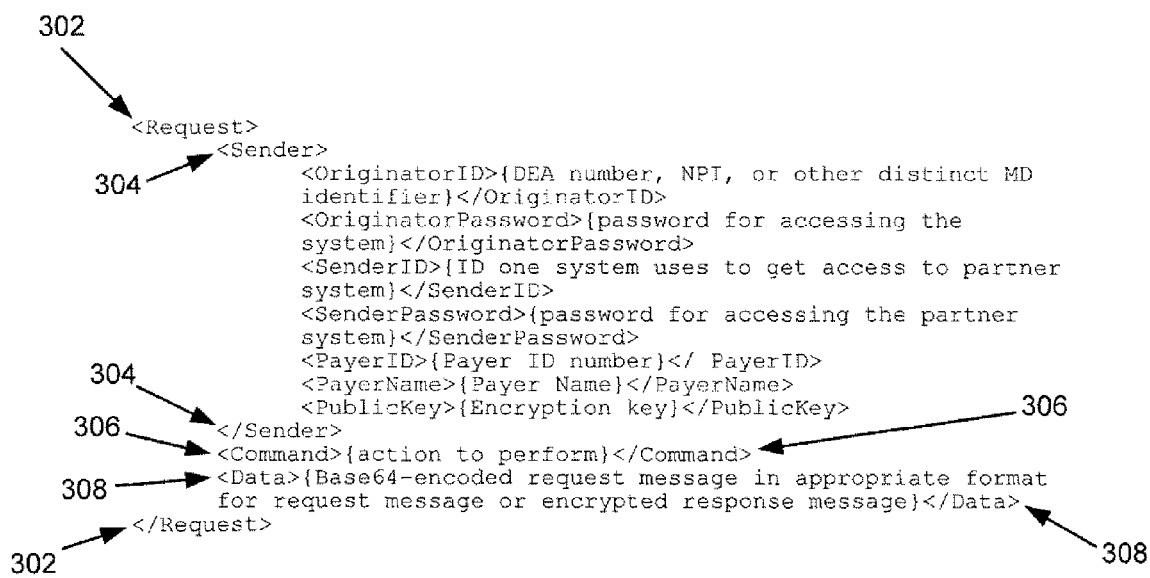

FIG. 3 shows an example of an Extensible Markup Language (XML) wrapper used to used to transmit a medication history request and response message in accordance with an example embodiment of the invention.

DETAILED DESCRIPTION OF THE INVENTION

The invention is directed to systems and methods for communicating sensitive and/or confidential medical information with the use of encryption. In many instances it is the goal of health care providers and facilitators to expedite the prescribing of medical treatments and/or the adjudicating of heath insurance claims. For example, one of the goals of a pharmacy benefit management service PBM is to provide formulary information at the point of medication dispensing. However, if that PBM's confidential formulary information may be compromised by a competitor during transmission, then such transfer of confidential data may not occur.

As a result, current electronic prescription processors (also referred to herein as "host servers" or "hubs") rely on the eligibility match for a given patient whose PBM is associated with that particular host server prior to allowing that PBM's eligibility, formulary, and other confidential information to be accessed. However, the host server cannot provide valuable formulary, medication history, or prior authorization information when the patient is not within the PBMs the host server covers. Moreover, currently, there is no real-time formulary messaging standard; rather host servers are providing physician aggregators formulary files in batch mode with periodic file updates. However, such batch updating is limiting.

Example embodiments of the invention are directed to transmitting a request for sensitive medical data, where the request includes a public key for encryption as an XML node. An example embodiment of the invention uses a public key for encrypting a response to a request and a private key, held only by the requestor of data, which is used for decrypting the response data. The public key may be used by the responding party to encrypt the response message and respond to the request. The only party in the network path that should be able to decrypt the message is the originator of the request message because only the requester will have the private key, which is required to decrypt data. The requested information may be formulary information, eligibility information, patient medical records, medication history information, prior authorization information, or other information that would be considered confidential, proprietary, private or sensitive to the requestor or responder. The parties acting as a requestor or responder (depending on who initiated the communication) may be patients, pharmacies, retailers, PBM, physician's offices, hospitals, payer systems, or other parties that handle medical related information.

Such a communication system better leverages data from PBM's covered by both one particular host server and a partner hub. This model also allows for PBM's to keep their proprietary formulary files private and may be utilized in real-time eligibility, formulary, medication history, and prior authorization messaging.

Example embodiments of the invention now will be described more fully hereinafter with reference to the accompanying drawings, in which example embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention are described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Example embodiments of the invention will hereinafter be described with reference to the figures, in which like numerals indicate like elements throughout the several drawings. FIG. 1 shows a transmission system for communicating confidential medical information in accordance with an example embodiment of the invention. In particular, FIG. 1 is an example of an operating environment for implementation of certain embodiments of the invention, including a pharmacy point-of-service ("POS") device 104, a host server 108, partner hubs 110, and PBMs 116 and 118, which are each configured for accessing and reading associated computer-readable media having stored thereon data and/or computer-executable instructions for implementing the various methods of the invention. Generally, network devices and systems include hardware and/or software for transmitting and receiving data and/or computer-executable instructions over a communications link and a memory for storing data and/or computer-executable instructions. Network devices and systems may also include a processor for processing data and executing computer-executable instructions, as well as other internal and peripheral components that are well known in the art. As used herein, the term "computer-readable medium" describes any form of memory or a propagated signal transmission medium. Propagated signals representing data and computer-executable instructions are transferred between network devices and systems.

As shown in the example embodiment of FIG. 1, the system includes one or more physician (or pharmacy) offices 102 containing point-of-service ("POS") devices 104. The POS device is, in turn, in communication with a host server 108 and/or one or more partner hubs 110 via a network 106. The host server 108 is also in communication with one or more partner hubs 110. Further, the host server 108 is in communication with one or more host server PBMs 112 (also referred to as host server member PBMs or host server subscriber PBMs), while the partner hubs 110 are connected to partner hub PBMs (also referred to as partner hub member PBMs or partner hub subscriber PBMs).

Referring to FIG. 1, it will be appreciated that the POS device 104 may be any processor-driven device, such as a personal computer, laptop computer, handheld computer and the like. In addition to a processor, the POS device 104 may further include a memory, input/output ("I/O") interface(s) and a network interface. The memory may store data files and various program modules, such as an operating system ("OS") and a practice management module. In alternative embodiments of the invention, the POS device 104 may be a dedicated kiosk, emulated by a computer software program installed on a computer, or accessible via a webpage.

The practice management module may comprise computer-executable instructions for performing various routines, such as those for creating and/or aggregating and submitting requests for confidential, proprietary, private or sensitive medical information. Such information may include formulary information, eligibility information, patient medical records, medication history information, prior authorization information, or other information that would be considered confidential, proprietary, private or sensitive to the requestor or responder. The parties acting as a requestor or responder (depending on who initiated the communication) may be patients, pharmacies, retailers, PBM, physician's offices, hospitals, payer systems, or other parties that handle medical related information.

I/O interface(s) facilitate communication between the processor and various I/O devices, such as a keyboard, mouse, printer, microphone, speaker, monitor, etc. The network interface may take any of a number of forms, such as a network interface card, a modem, etc. These and other components of the POS device 104 will be apparent to those of ordinary skill in the art and are therefore not discussed in more detail herein.

The POS device 104 is used to create and/or aggregate the request for medical information from the physician's (or pharmacy's) office 102. Confidential medical information may be requested by a pharmacist or other health care provider or may be received by the POS device 104 in electronic form from another electronic prescription service (not shown in FIG. 1). The POS device 104 may also be configured for handling other types of prescription transactions.

An example embodiment of the invention uses public-key encryption technology, which includes a public key for encrypting response data and a private key used for decrypting the response data. A variety of public-key encryption algorithms may be used and an agreed upon algorithm to be used by the host server 108 and/or the partner hub 110 and/or the physician POS device 104. In one example embodiment of the invention, software will be used to create a real-time message set for National Council for Prescription Drug Programs (NCPDP) standardization to ensure the same standards in messaging are implemented by participating host servers and hubs.

A request message may be created by an aggregator associated with the POS device 104 and/or physician's office 102 and transmitted to the host server 108 associated with that physician's office 102. For formulary, medication history, and prior authorization messaging, the physician aggregator can place a payer identification number (or payerID), payer name, and other information pertinent to associating the patient to its PBM in an XML wrapper so that the system (server or hub) receiving the request for information can look at the XML wrapper to determine if the information request is associated with its PBMs. To protect the privacy of the response message, the physician aggregator will send a public key as one of the XML node values in the request message. By placing PBM information and physician-routing information in the XML wrapper as well as providing a pubic key to allow for a responder to encrypt their response message(s), the systems (i.e., servers and hubs) can support private communication of confidential medical information such as formulary information, a desire expressed by a number of PBM's.

Requests for medical information may be transmitted from the POS device 104 to the host server 108 in batch, real-time or near real-time. POS devices 104 may connect to the host server 112 through a variety of methods, including dial-up, frame relay or leased-line. In an example embodiment, the entire system is supported by redundant software, communications links, and uninterruptible power supplies, thereby ensuring that all connections will provide reliable, continuous operation and ensuring that all requests are routed quickly, accurately, and consistently.

The network 106 may comprise any telecommunication and/or data network, whether public or private, such as a local area network, a wide area network, an intranet, an internet and/or any combination thereof and may be wired and/or wireless. Due to network connectivity, various methodologies as described herein may be practiced in the context of distributed computing environments. Although the example POS device 104 is shown for simplicity as being in communication with the host server 108 via one intervening network 106, it is to be understood that any other network configuration is possible. For example, the pharmacy POS device 104 may be connected to a pharmacy's local or wide area network, which may include other devices, such as gateways and routers, for interfacing with another public or private network 106. Instead of or in addition to a network 106, dedicated communication links may be used to connect the various devices of the example embodiments of the invention.

Similar to the POS device 104, the host server 108 may be any processor-driven device that is configured for receiving and fulfilling requests related confidential medical information. The host server 108 may therefore include a processor, a memory, input/output ("I/O") interface(s) and a network interface. The memory may store data files and various program modules, such as an operating system ("OS") and a database management system ("DBMS"). Those skilled in the art will appreciate that the host server 108 may include alternate and/or additional components, hardware or software. In addition, the host server 108 may be connected to a local or wide area network (not shown) that includes other devices, such as routers, firewalls, gateways, etc.

The host server 108 may include or be in communication with one or more databases. The databases 105 may store, for example, data relating to patients, data relating to pharmacies, payers, state prescription laws, prescription drugs, formularies, and consumers, such as typical doses filled by consumers, typical drugs prescribed by doctors, most common daily dose values, common daily dose values, likelihood indicators and other data that may be considered to be proprietary, private, confidential, and/or sensitive. The databases may also store reports and other data relating to the results of the claim screening and edit processes The databases may also store any other data used or generated by the host server 108 or data used to generate requests on behalf of pharmacies and/or physician's offices 102 to retrieve medical information from a partner hub 110 or other source. Although a single database may be utilized, those skilled in the art will appreciate that multiple physical and/or logical databases may be used to store the above mentioned data. For security, the host server 108 may have a dedicated connection to one or more databases. Alternatively, the host server 108 may also communicate with one or more databases via a network 106.

The host server 108 may perform real-time request and response messaging with partner hub 110. In an example embodiment of the invention, the host server 108 software may be able to access Electronic Medical Records (EMR) and Script Writing software remotely through the network 106 or have access to eligibility, formulary and medication history information through local and/or remote databases, vendors accessible through the network 106, or the POS devices 104.

When the host server 108 received a pharmacy claim for a patient whose PBM 114 is covered by the partner hub 110, the host server may create a request message and forward that to the partner hub 110. The partner hub may then use the encryption means provided in the request to encrypt the confidential data to be transmitted back to the originating POS device 104 through the host server 108. The host server 108 parses the response message received from the partner hub 114.

While the example embodiment described with reference to FIG. 2 below shows that a patient has coverage from at least one host server PBM 112 or partner hub PBM 114, in other embodiments a patient may have coverage from multiple PBMs (host server PBM 112 and/or partner hub PBM 114) due to either an ending or lapse in coverage from one PBM and beginning coverage of a new PBM such as when a patient changes insurance providers or when a patient purchases or acquires secondary or tertiary insurance coverage. In an example embodiment of the invention, the host sever 108 may aggregate the encrypted results (e.g., sensitive data associated with a partner hub PBM 114 such as formulary files) received from one or more partner hubs 110 (each with its associated set of partner hub PBMs 114) with the results the host server 108 receives from the host server PBM(s) 112 in the event the patient has secondary and/or tertiary coverage.

In alternative embodiments of the invention, the host server 108 may use the encryption means provided in the request to encrypt the confidential data to be transmitted back to the originating POS device 104. If the drug in question was not on formulary for a patient, the system would send a reject message to the pharmacy listing the therapeutic substitutions that are on formulary for that patient. A more detailed discussion of the process of using public key encryption techniques for transferring confidential information form the partner hub in response to the request from the physician's office (or pharmacy) is discussed below with reference to FIG. 2.

A PBM may represent one or more payer systems or employer groups. A payer system may be an insurance company, a financial institution or another financial service provider. In alternative embodiments of the invention, a payer system may be in direct communication with a host server 108 or partner hub 110 and operate as the host server PBM 112 or partner hub PBM 114 would. In certain embodiments, the host server 108 may serve as a clearinghouse for multiple PBMs 112. As noted above, PBMs 112 and 114 may include systems operated by insurance companies, financial institutions and other financial service providers. In example embodiments of the invention, entities may be consider PBMs 112, PBMs 114 or some entities may qualify as either or both depending on the transaction.

Those skilled in the art will appreciate that the operating environment shown in and described with respect to FIG. 1 is provided by way of example only. Numerous other operating environments, system architectures and device configurations are possible. Accordingly, the invention should not be construed as being limited to any particular operating environment, system architecture or device configuration.

FIG. 2 shows a block diagram flowchart of the process for communicating confidential medical information in accordance with an example embodiment of the invention. As shown in the example embodiment of FIG. 2, the process starts at step 202 where a request message is created and transmitted to a host server associated with that physician's office. In an example embodiment of the invention the request message may be created, at least in part, by an aggregator. For formulary, medication history, and prior authorization messaging, the physician aggregator can place the payerID, payer name, and other information pertinent to associating the patient to its PBM in an XML wrapper so that the system receiving the request for information can look at the XML wrapper to determine if the information request is associated with its PBMs. To protect the privacy of the response message, the physician aggregator will send a public key as one of the XML node values in the request message. In an example embodiment of the invention, public-key encryption technology, which includes a public key for encrypting response data and a private key used for decrypting the response data. By placing PBM information and physician-routing information in the XML wrapper as well as encrypting response messages, the systems (i.e., servers and hubs) may provide privacy with respect to confidential, private or sensitive information of either the requesting party or responding party including formulary information associated with one or more PBMs. Next, step 204 is invoked where the host server receives the request for confidential medical information from a physician's office.

When a request for confidential medical information is received at the host server, step 206 is invoked where the receiving system determines if that request is associated with the PBMs the receiving host server represents (i.e., member PBM or subscribing PBM). If the request is associated with the host server's PBMs, then step 208 may be invoked and the host server can open and process the request, without a need to encrypt the response and then transmit the response back to the requesting party.

If the patient is not in the host server's database, then step 210 is invoked, where the host server forwards the request to the partner hub without opening or parsing the message so that the partner hub can see if the patient is in their database. Like the host server, the partner hub may also utilize the XML wrapper that is part of the request to determine if the request is associated with their PBMs. For example, the partner hub may open and parse the message only if the payerID and payer name located in the XML wrapper are associated with their PBMs. For a more detailed discussion of the XML wrapper see the discussion of FIG. 3 below.

In order for the request to be forwarded properly the throughput rate and response times associated with the partner hub's real-time messaging system would need to be known by the host server (or provided to the host server from the partner hub). If either the throughput rate or the response times do not meet the requirements of the network on which the host server is operating, then an alternative embodiment may be used.

In accordance with an alternative embodiment of the invention, the sensitive data of a partner hub may be stored locally with the host server. In such an embodiment the host server would perform a local lookup of formulary data for transactions whose patients are covered by PBM's associated with the partner hub. The host server and the partner hub would provide a means for safe and secure transfer of the partner hub's formulary files (e.g., using Secured File Transfer Protocol (SFTP) or similar protocols known by those of ordinary skill in the art) and allow the partner hub to update these files on an as-needed basis. If a drug prescribed to a patient is not on a formulary associated with the member PBMs, then a reject message is sent to the pharmacy listing the therapeutic substitutions that are on formulary for that patient.

Once the request has been forwarded to the partner hub, step 212 is invoked to determine if the request is associated with the PBMs the receiving partner hub represents (i.e., a partner hub member PBM or partner hub subscribing PBM). If the partner hub finds that the PBM associated with the request is a member of that particular hub, then step 214 is invoked, where the partner hub returns a response to the host server, which may include encrypted sensitive data associated with a PBM accessible through the partner hub (e.g., formulary files, medical information of a patient associated with the initial request, etc.). The host server may then return the response, which may include the information received from the partner hub, to the physician. The partner hub and/or host server that sends the response message may use that public key and an agreed-upon encryption algorithm to encrypt the response message node of the XML document. In an example embodiment of the invention, only the physician aggregator will have the private key needed to decrypt the response message. Otherwise step 216 may be invoked where the partner hub may forward on the request to another hub or server for their evaluation. Alternatively, the partner hub may return a reject message to the host server informing the host server (and ultimately the physician's office) that the request could not be accommodated or that the relevant PBM could not be located. As described above with reference to FIG. 1, in alternative embodiments of the invention, the host sever may aggregate the encrypted results received from one or more partner hubs (each with its associated partner hub PBMs) with the results the host server receives from the host server PBM(s) in the event the patient has secondary and/or tertiary coverage.

FIG. 3 shows an example of an XML wrapper used to transmit a medication history request and response message in accordance with an example embodiment of the invention. As shown in the example XML wrapper of FIG. 3, messages exchanged between the host server and a partner hub may use an XML wrapper to assist with routing the sensitive information. In the particular XML wrapper shown in FIG. 3, XML tags surround and partition data sets according to categories (or nodes). The entire data set is located inside XML tags labeled as "request" 302. Inside those tags the data is separated by other XML tags for "sender" 304, "command" 306 and "data" 308.

The sender tags 304 encompass various types of data associated with the sender of the request. This data may include identification data associated with the originator of the request, which may be a Drug Enforcement Administration (DEA) number, National Provider Identifier (NPI), or other distinct physician (MD) identifier. The data associated with the sender tag may also include the originator's password for accessing the host system. The data associated with the sender tag may also include sender identification, which is identification data one system uses for gaining access to a partner system. A sender password may also be included for accessing the partner system. Further, the data associated with the sender tag may also include tags for payer ID numbers, payer name and/or an encryption key (e.g., a public key).

In addition to all that is included between the sender tags 304, the command tags 306 surround the action requested to be performed, and the data tags 308 surround the request message in appropriate format (e.g., Base64-encoded or other formats known by those of ordinary skill in the art) for the request message or encrypted response message. In alternative embodiments of the XML wrapper associated with some messages, some of the nodes may be omitted or left blank.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

That which is claimed:

1. A method of transferring medical information comprising:
receiving, at a host server comprising one or more processor-driven devices, a request for medical information associated with a patient, wherein the request includes a public key for encryption, wherein the public key is included in the request as an Extensible Markup Language (XML) node, and wherein the XML node is part of an XML wrapper, and wherein the host server is operable for transmitting messages between a plurality of point-of-service (POS) devices and a plurality of partner hubs associated with a plurality of partner hub pharmacy benefit management services (PBMs);
determining, by the host server based at least in part on information contained in the XML wrapper, one of the plurality of partner hub PBMs to which the request is to be transmitted, wherein the information contained in the XML wrapper comprises information for identifying the one of the plurality of partner hub PBMs with which the patient is associated;
transmitting, from the host server, the request including the public key as an XML node of the XML wrapper to one of the plurality of partner hubs associated with the one of the plurality of partner hub PBMs to which the request is to be transmitted;
receiving, at the host server, an encrypted response from the one of the plurality of partner hubs, wherein the encrypted response is encrypted utilizing the public key and an encryption algorithm; and
transmitting, from the host server, the encrypted response to the original requestor.

2. The method of claim 1, wherein receiving a request for medical information associated with a patient includes receiving a request that comprises PBM and physician-routing information in the XML wrapper.

3. The method of claim 1, wherein receiving a request for medical information associated with a patient includes receiving a request that comprises one or more selections from the group consisting of formulary information, eligibility information, patient medical records, medical history information, and prior authorization information.

4. The method of claim 1, wherein transmitting the response to the original requestor includes transmitting the response wherein at least a portion of the response is associated with a private key for decrypting the at least a portion of the response.

5. The method of claim 1, wherein receiving a request for medical information associated with a patient includes receiving a request comprising sender tags, wherein the sender tags encompass identification data associated with the requestor.

6. The method of claim 1, wherein receiving a request for medical information associated with a patient includes receiving a request comprising sender tags, wherein the sender tags encompass identification data that includes a password.

7. The method of claim 1, wherein determining the one of the plurality of partner hub PBMs to which the request is to be transmitted further comprises determining that the patient is not associated with at least one member PBM; and forwarding the request to the one of the plurality of partner hubs associated with the one of the plurality of partner hub PBMs.

8. The method of claim 1, wherein the information contained in the XML wrapper for identifying the one of the plurality of partner hub PBMs with which the patient is associated comprises at least one of: (a) a payer identifier; or (b) a payer name; wherein the payer is associated with the one of the plurality of partner hub PBMs.

9. A method of transferring medical information comprising:
creating a request, at a point-of-service (POS) device, for medical information associated with a patient, wherein the request includes a public key for encryption, wherein the public key is included in the request as an Extensible Markup Language (XML) node, and wherein the XML node is part of an XML wrapper, wherein an identity of a partner hub pharmacy benefit management service (PBM) with which the patient is associated is included in the XML wrapper of the request, and wherein the partner hub PBM is associated with a partner hub;
transmitting the request from the POS device to a host server for the host server to transmit to the partner hub associated with the partner hub PBM;
receiving, at the POS device, a response to the request for medical information associated with a patient, wherein at least a portion of the response is encrypted by the partner hub utilizing the public key and an encryption algorithm;
decrypting, by the POS device, the at least a portion of the encrypted response utilizing a private key.

10. The method of claim 9, wherein creating a request for medical information associated with a patient includes creating a request through the use of an aggregator.

11. The method of claim 9, wherein creating a request for medical information associated with a patient includes adding sender tags to the request, wherein the sender tags encompass identification data associated with the requestor.

12. The method of claim 9, wherein creating a request for medical information associated with a patient includes adding sender tags and command tags to the request, wherein the sender tags encompass identification data that includes a password.

13. The method of claim 9, wherein the information contained in the XML wrapper for identifying the one of the plurality of partner hub PBMs with which the patient is associated comprises at least one of: (a) a payer identifier; or (b) a payer name; wherein the payer is associated with the one of the plurality of partner hub PBMs.

14. A system for reporting personal medical account balances comprising:

a host server in communication with a plurality of point-of-service (POS) devices and a plurality of partner hubs associated with a plurality of partner hub pharmacy benefit management services (PBMs), wherein the host server contains a processor that executes software instructions for:

receiving a request for medical information associated with a patient, wherein the request includes a public key for encryption, wherein the public key is included in the request as an Extensible Markup Language (XML) node, and wherein the XML node is part of an XML wrapper, determining, based at least in part on information contained in the XML wrapper, one of the plurality of partner hub PBMs to which the request is to be transmitted, wherein the information contained in the XML wrapper comprises information for identifying the one of the plurality of partner hub PBMs with which the patient is associated, transmitting the request including the public key as an XML node of the XML wrapper to one of the plurality of partner hubs associated with the one of the plurality of partner hub PBMs to which the request is to be transmitted, receiving an encrypted response from the one of the plurality of partner hubs, wherein the encrypted response is encrypted utilizing the public key and an encryption algorithm, and transmitting the encrypted response to the original requestor.

15. The system of claim 14, wherein the request contains PBM and physician-routing information in the XML wrapper.

16. The system of claim 14, wherein at least a portion of medical information associated with a patient comprises one or more selections from the group consisting of formulary information, eligibility information, patient medical records, medical history information, and prior authorization information.

17. The system of claim 14, wherein the at least a portion of the response is associated with a private key for decrypting the at least a portion of the response.

18. The system of claim 14, wherein the software instructions executed by the host server include, when determining the one of the plurality of partner hub PBMs to which the request is to be transmitted, determining that the patient is not associated with at least one member PBM.

19. The system of claim 14, wherein the information contained in the XML wrapper for identifying the one of the plurality of partner hub PBMs with which the patient is associated comprises at least one of: (a) a payer identifier; or (b) a payer name; wherein the payer is associated with the one of the plurality of partner hub PBMs.

* * * * *